(12) United States Patent
Chana et al.

(10) Patent No.: US 9,704,383 B2
(45) Date of Patent: Jul. 11, 2017

(54) CALIBRATION SYSTEM FOR EQUIPMENT

(71) Applicant: Eurotherm Limited, London (GB)

(72) Inventors: Paramjit Chana, Worthing Sussex (GB); David Mitchell, Coleford Radstock (GB); Karl Haigh, Rawmarsh Rotherham (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 14/926,592

(22) Filed: Oct. 29, 2015

(65) Prior Publication Data

US 2016/0247387 A1   Aug. 25, 2016

(30) Foreign Application Priority Data

Oct. 30, 2014   (GB) .................................. 1419359.3

(51) Int. Cl.
| | | |
|---|---|---|
| *G08B 29/00* | (2006.01) | |
| *G08B 29/20* | (2006.01) | |
| *G06Q 10/00* | (2012.01) | |
| *G06K 19/06* | (2006.01) | |
| *G08B 25/00* | (2006.01) | |

(52) U.S. Cl.
CPC ....... *G08B 29/20* (2013.01); *G06K 19/06037* (2013.01); *G06Q 10/00* (2013.01); *G06Q 10/20* (2013.01); *G08B 25/006* (2013.01)

(58) Field of Classification Search
CPC .... G08B 29/20; G06K 19/06037; G06F 19/00
USPC .................................. 340/514; 702/85, 119
See application file for complete search history.

(56) References Cited

U.S. PATENT DOCUMENTS

| | | | |
|---|---|---|---|
| 5,918,191 A | 6/1999 | Patel | |
| 6,581,020 B1* | 6/2003 | Buote | G06F 17/30386 |
| | | | 702/119 |
| 7,406,388 B2* | 7/2008 | Casto | G06F 11/24 |
| | | | 702/85 |
| 2004/0024783 A1 | 2/2004 | Chang | |
| 2005/0027468 A1 | 2/2005 | Turner | |
| 2006/0047455 A1 | 3/2006 | Catelani et al. | |

OTHER PUBLICATIONS

European Patent Office, The Extended European Search Report in European Application No. 15250019.5 dated Dec. 3, 2015, 6 pages.

* cited by examiner

*Primary Examiner* — Tai T Nguyen
(74) *Attorney, Agent, or Firm* — Stephen Manetta; Ralph Graham

(57) ABSTRACT

A method of and apparatus for calibration of instrumentation and provision of calibration certificates comprises a portable field operable communication device and a remote information management device in wireless communication with one another, a data store comprising information related to each instrument to be calibrated, the portable device being operable to receive calibration requests from the management device and to facilitate input of data from an instrument the subject of calibration, and the management device being operable to facilitate generation of a calibration certificate or error report subsequent to receipt of input data from the portable device.

20 Claims, 1 Drawing Sheet

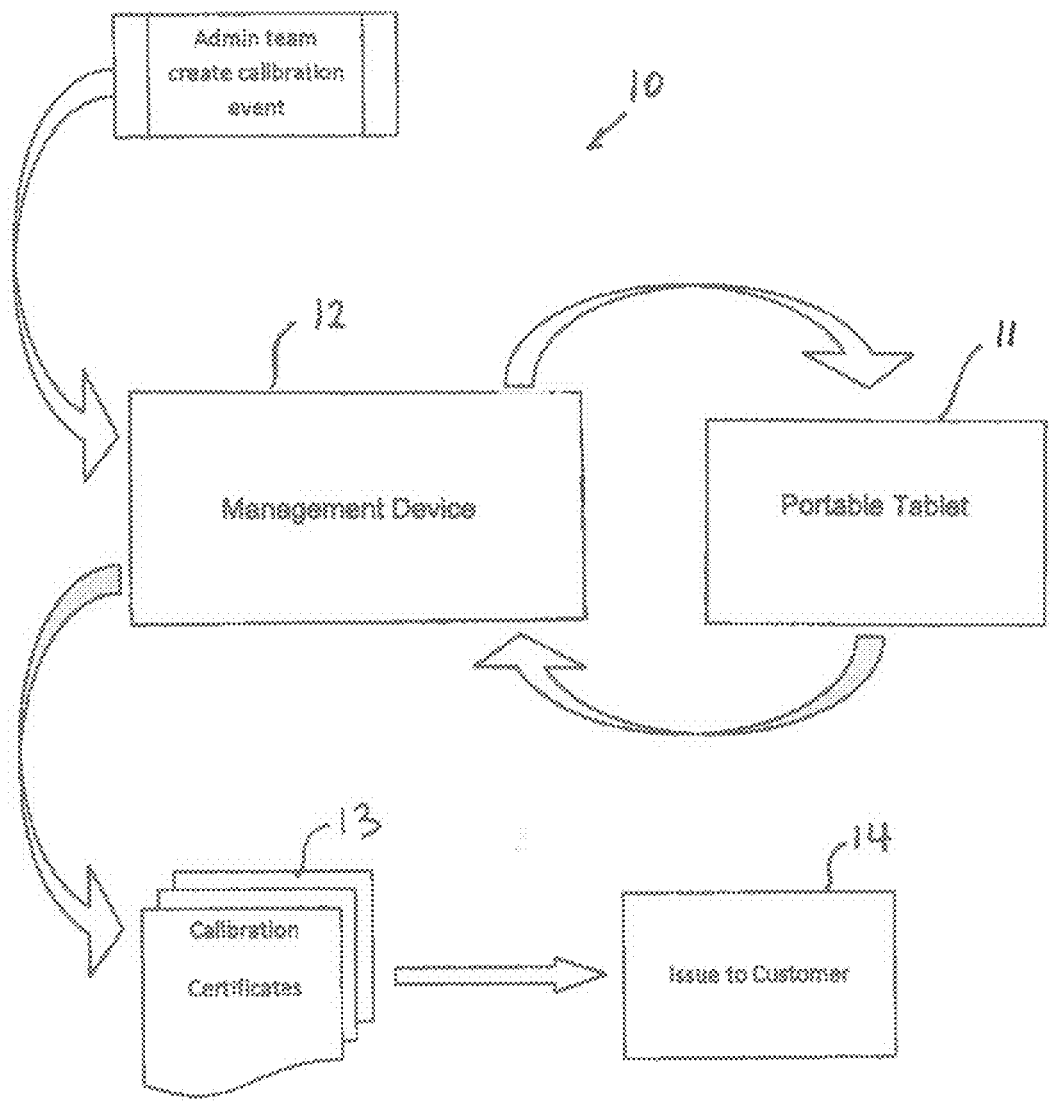

CALIBRATION SYSTEM FOR EQUIPMENT

TECHNICAL FIELD

This invention relates to a method and apparatus for the calibration of equipment.

It relates in particular, though not exclusively, to a method and apparatus for the substantially paperless provision of calibration certificates.

BACKGROUND

Especially in relation to large and complex manufacturing and processing plant, the efficient and safe operation of the plant typically depends heavily on the accurate and reliable operation of instrumentation. To ensure that the instrumentation provides accurate and reliable information it is customary for a service engineer periodically to conduct calibration checks such that the manufacturing or processing plant operates efficiently and maintains a required quality standard. Particularly because of potential safety implications a regulatory body typically will require that calibration is properly undertaken and, for the purpose of confirming compliance with regulatory obligations, there is a requirement often to provide calibration certificates.

In one long established method for generating hard copies of calibration certificates a service engineer will visit an equipment installation to obtain data from instrumentation and, typically, then enter the information on a pre-printed report sheet.

On return to the office the service engineer then conducts a comparison of the collected data with pre-established data relating to appropriate measurement and tolerances for the inspected instrumentation. Depending of the result of that comparison a calibration certificate is then prepared and issued to the equipment operator and/or regulatory body, or an adverse calibration report is issued. In the latter case it is a responsibility of the service engineer to alert the operator of the manufacturing or processing equipment to the need for remedial action and re-inspection.

Accordingly, it will be understood that the traditional, established procedures for generating calibration certificates or reports comprise a field calibration step which is carried out as a manual process, with measurements recorded on paper and then manually entered into the appropriate information system. From this data a calibration certificate is generated for instrumentation that is found to be in good order. This inevitably is a slow process and prone to human error.

Additionally there is a risk of human error resulting in a failure to provide an alert that any instrumentation requires remedial action, and to timely conduct a calibration re-check following remedial action in respect of defective instrumentation.

SUMMARY

The present invention seeks to provide an improved method and a system apparatus for the calibration of instrumentation.

In accordance with one aspect of the present invention there is provided apparatus operable as a calibration system for calibration of instrumentation and provision of calibration certificates, said system comprising:

a portable field operable communication device and a remote information management device in wireless communication with the portable field operable communication device;

wherein at least one of said management device and portable communication device comprises a data store comprising at least one of the identity of each instrument to be calibrated, the frequency with which each instrument is to be calibrated and tolerance limits for compliant instrument readings;

said management device being operable to transmit calibration requests to the portable device;

said portable device comprising a display and an input, said display being operable to display information from the management device and to display the identity of an instrument to be calibrated, said input of the portable device being operable for input of data from an instrument the subject of calibration, and said management device further being operable to facilitate generation of a calibration certificate or error report subsequent to receipt of input data from the portable device.

In accordance with another aspect of the present invention there is provided a method for calibration of instrumentation and provision of calibration certificates, said method comprising:

providing a portable field operable communication device and a remote information management device in wireless communication with the portable field operable communication device;

said portable device comprising a display and an input;

inputting into a data store of at least one of said management device and portable device at least one of the identity and location of each instrument to be calibrated, the frequency with which each instrument is to be calibrated and tolerance limits for compliant instrument readings;

operating the management device to transmit calibration requests to the portable device for display on the display of the portable device;

inputting on the portable device data from an instrument the identity of which is displayed on the portable device, and operating the management device to facilitate generation of a calibration certificate or error report subsequent to receipt of input data from the portable device.

BRIEF DESCRIPTION OF THE DRAWINGS

FIG. 1 is an exemplary block diagram of an equipment calibration system in accordance with an embodiment of the invention.

DETAILED DESCRIPTION

The terms "instrumentation" and "instrument(s)" are used herein to embrace devices that provide a visual display and also other monitoring devices such as pressure sensors and temperature sensors that may not necessarily provide a visual display.

The term "calibration" is used herein to embrace an inspection to check that a single reading from an instrument is within an acceptable tolerance band relative to the actual value of a measured parameter such as pressure or temperature. It embraces also a calibration procedure in which the readings from an instrument are checked to be within a predetermined tolerance band for each of a range of different magnitudes of a measured parameter.

Preferably the management device is operable automatically to transmit calibration requests to the portable device.

Preferably information concerning at least one, and more preferably each of the identity and location of each instrument to be calibrated, the frequency with which each instrument is to be calibrated and tolerance limits for compliant instrument readings is stored in the data store of the management device.

The system may be operable to provide an alert message on the portable device in the event of inputted data being indicative of a potential error in entry of data on the portable device. The calibration system preferably comprises software which employs an algorithm to verify the integrity of inputted data. Thus, in use, data may be validated as it is entered into the portable device, and with a requirement for re-entry in the event that initially inputted data has not been verified.

Preferably the system is operable to require the sequential inputting to the portable device of information from an instrument the subject of calibration and information from an accurate, pre-calibrated measuring device which is arranged to be exposed to the same conditions, such as temperature or pressure, as the conditions to which the instrument the subject of calibration is exposed.

The identity of an instrument may be stored in the management device as the name or an allotted number of the instrument and/or it may be stored as the location of the instrument. For the purpose of the latter the portable device may comprise GPS functionality. Thus the portable device may display both the name/number and positional information of the instrument the subject of a calibration check thereby to minimise the risk of data being inputted from an instrument other than the one intended to be the subject of a calibration check.

Although generally the identity of an instrument that requires calibration will be stored in the management device, there may be occasions for which a new instrument or a replacement for a defective instrument has been installed prior to the identity of any such instrument being inputted to the management device. The calibration system and method of the present invention provide that at least minimal data concerning any new or replacement instrument may be inputted to the portable communication device and subsequently transmitted therefrom to the management device. If necessary any additional data concerning the new or replacement instrument may subsequently be inputted directly to the management device. Preferably the data transmitted from the portable communication device to the management device includes positional information regarding a new or replacement instrument.

The portable communication device may be operable to update the management device to delete information concerning any instrument that is no longer requiring calibration, for example no longer being used, or that has failed calibration and has been removed for example to be replaced by a new instrument.

The calibration system and method may comprise use of a portable communication device which incorporates a scanner. The scanner may be employed to read a UPC or matrix barcode affixed to the instrument the subject of the calibration check thus further assisting in ensuring that a certificate is issued in respect of a correctly identified instrument.

The calibration system and method may comprise use of a portable communication device adapted for communication, preferably wirelessly, with a printer, for example communication with a Bluetooth type printer. The method of the present invention accordingly may comprise operation of the portable communication device to print a calibration label which may then be applied to an instrument from which data has been inputted to the portable communication device. The portable communication device may comprise an integral printer facility. The method may further comprise printing onto calibration label information, such as in the form of a QR (matrix), a serial number or other identification of the portable communication device.

The data store preferably is substantially wholly resident in the management device. The management device may comprise an SQL-server type database.

The management device may be in wireless communication with the portable device by, for example, 3G or 4G services or, if such services are not available, by a company VPN or in stand-alone mode.

The management device may be designed to support concurrent use of two or more portable devices. Preferably the management device incorporates a conflict management tool to manage any potential conflicts in the event of a plurality of users concurrently accessing the data store for the same records.

The management device preferably is operable to store a plurality of different calibration certificate templates which may include a plurality of templates each in respect of a respective one of a plurality of different languages.

The management device may be operable to transmit a report (for example a calibration certificate or failure report) to the owner/operator of the instrumentation, or to a data store, such as the "cloud", from which the owner/operator or other authorised entity, such as a regulatory body, can access certificates or reports.

The portable communication device typically and conveniently may be a tablet operable for display of instrument identity and entry of calibration results. Alternatively other types of PDA or a lap top computer may be employed.

Typically data from an instrument may be inputted to the portable device manually, but alternatively or additionally may be inputted in a wireless manner from a wireless enabled instrument.

In the event of an instrument failing a calibration check the system may be operable to generate a failure report instead of a calibration certificate. Additionally or alternatively the system may be operable automatically to generate a reminder for a calibration re-check at the end of one or more periods of time subsequent to the calibration failure.

The portable communication device may incorporate user identification means whereby the system may record the identity of a service engineer performing a specific calibration procedure.

It is important that the calibration system and method of the invention are employed only by appropriately trained and qualified personnel in order to avoid or at least minimise any risk of a favourable calibration certificate being issued incorrectly. In particular, regulatory authorities such as UKAS in the UK require that personnel undertaking calibration tasks are appropriately trained and approved. Accordingly, the aforementioned user identification means which records the identity of a service engineer performing a specific calibration procedure may incorporate a form of user identification, such as by password protection or fingerprint scanning, whereby information obtained from an instrument is transmitted to the management device via a portable communication device only in situations in which there has been entered into the portable communication device information relating to the identity of the user and wherein said identity information has been confirmed by the portable communication device or management device as being that of an appropriately authorised approved person. That is, information is only input if user identification requirements are satisfied.

The portable communication device preferably is operable to enable a trained and authorised user to view a draft calibration certificate as created by the management device following receipt and validation of inputted calibration data, and to approve and then formally issue the calibration certificate. Thus a potentially significant saving of time between conducting a calibration check and issue of a certificate is achieved as compared with conventional paper based techniques.

One embodiment of the present invention will be now be described, by way of example only, with reference to the accompanying diagrammatic drawing, being a block diagram of an equipment calibration system in accordance with the present invention.

In this embodiment of the present invention an equipment calibration system 10 for issuing calibration certificates comprises a portable communication device 11 and a remote management device 12 which is in two-way wireless communication with the communication device.

The two way wireless communication may, for example, be any one of 3G, 4G or VPN.

The system suitably may employ a version of eCAT software as available from Eurotherm Limited.

In this embodiment the portable communication device 11 is a tablet comprising a conventional display panel and touch screen type keypad. The remote management device 12 comprises a data store which stores inputted information relating to the instruments to be calibrated. That information may include the identity (such as name, number or geographic location) of each instrument to be calibrated, required frequency of calibration checks and acceptable tolerance bands for each instrument. Typically the inputting of that information will be confined to an authorised administration team.

The management device also functions to receive from the tablet 11 the reading obtained from an instrument by a service engineer, and, if appropriate, to communicate with a printer or external data store to issue a calibration certificate or information from which a calibration certificate 13 may be prepared.

The management device comprises validation software to confirm the compatibility of recorded readings with other data related to the instrument the subject of the calibration check and optionally also to validate compatibility with readings obtained from other instruments of a plant or other equipment comprising a plurality of instruments.

Communication from the management device for generation of a calibration certificate may be to a printer for provision of a printed certificate or to a data store for storing a calibration certificate electronically and which is accessible by one or more of a plant operator whose instrument has been the subject of calibration, a certification administrator independent of the plant operator and a regulatory body 14.

From the foregoing it will be understood that the apparatus of the calibration system and the method of calibration enable a calibration certificate to be generated speedily. Furthermore, because of the validation checks undertaken by the management device, the risk of a calibration certificate being wrongly issued in respect of a particular instrument is substantially reduced as compared with hitherto employed paper based systems.

The invention claimed is:

1. A calibration system for calibration of instrumentation and provision of calibration certificates, said system comprising:
    a portable field operable communication device and a remote information management device in wireless communication with the portable field operable communication device;
    wherein at least one of said management device and portable communication device comprises a data store comprising at least one of an identity of each instrument configured for calibration, a frequency with which each instrument is configured for calibration, and tolerance limits for compliant instrument readings;
    said management device being operable to transmit calibration requests to the portable device;
    said portable device comprising a display and an input, said display being operable to display information from the management device and to display the identity of an instrument configured for calibration;
    said input of the portable device being operable for input of data from an instrument during calibration thereof; and
    said management device further being operable to facilitate generation of a calibration certificate or error report subsequent to receipt of input data from the portable device.

2. A calibration system according to claim 1 wherein the management device is operable automatically to transmit calibration requests to the portable device.

3. A calibration system according to claim 1 wherein the management device is operable to store information concerning at least one of the identity and location of each instrument configured for calibration, the frequency with which each instrument is configured for calibration, and tolerance limits for compliant instrument readings.

4. A calibration system according to claim 1 wherein the calibration system is operable to provide an alert message on the portable device when inputted data is indicative of a potential error in entry of data on the portable device.

5. A calibration system according to claim 1 wherein said calibration system verifies an integrity of inputted data.

6. A calibration system according to claim 5 and operable to require re-entry of inputted data when the integrity of said inputted data has not been verified.

7. A calibration system according to claim 1 and operable to require sequential inputting to the portable device of information from a pre-calibrated measuring device exposed to one or more conditions during calibration thereof and information from the instrument the subject of the calibration when the instrument is exposed to the one or more conditions.

8. A calibration system according to claim 1 wherein the portable device comprises GPS functionality.

9. A calibration system according to claim 8 wherein the portable device is operable to display at least one of identity information and positional information of the instrument the subject of the calibration check, wherein the identity information includes a name, number, or other form of identity of the instrument the subject of the calibration check.

10. A calibration system according to claim 1 wherein the portable communication device is operable for inputting of data in respect of an instrument for which information has not previously been stored in the management device.

11. A calibration system according to claim 10 wherein data transmitted from the portable communication device to the management device in respect of a new or replacement instrument includes positional information in respect of said instrument.

12. A calibration system according to claim 1 wherein the portable communication device is operable to update the management device to delete information concerning any instrument no longer requiring calibration.

13. A calibration system according to claim 1 wherein the portable communication device incorporates a scanner operable, in use, to read a scannable information marking affixed to the instrument the subject of calibration.

14. A calibration system according to claim 1 wherein the portable communication device is operable to communicate with a printer for printing of a calibration label or calibration certificate.

15. A calibration system according to claim 1 wherein the portable communication device comprises a printer function whereby the portable communication device is operable to print a calibration label or calibration certificate.

16. A calibration system according to claim 1 wherein the management device is operable to support concurrent use of at least two portable devices.

17. A calibration system according to claim 1 wherein the portable communication device incorporates user identification means and wherein the system records an identity of a user performing a specific calibration procedure.

18. A calibration system according to claim 17 wherein the portable communication device is operable to establish that the user is an authorized user and to permit input and transmission of information from an instrument to the management device only if the user is established as an authorized user.

19. A calibration system according to claim 1 wherein the portable communication device incorporates a scanner and said scanner is employed to read a scannable code such as a UPC or matrix barcode affixed to the instrument the subject of a calibration check.

20. A calibration system according to claim 1 wherein the management device is operated to transmit a report, which may be a calibration certificate or failure report to one or more of, to an owner or operator of the instrument, to a data store and/or to an authorized entity.

* * * * *